Inventors
PAUL ANDEREGG
ROLF G. GRANER
By Herbert Stern
Attorney

United States Patent Office 3,649,419
Patented Mar. 14, 1972

3,649,419
WRAPPING MACHINE
Paul Anderegg, Horgen, and Rolf Gerhard Graner, Oberrieden, Switzerland, assignors to International Standard Electric Corporation, New York, N.Y.
Filed Feb. 20, 1970, Ser. No. 13,263
Claims priority, application Switzerland, Mar. 28, 1969, 4,724/69
Int. Cl. B32b 31/10; B65c 3/12
U.S. Cl. 156—567
4 Claims

ABSTRACT OF THE DISCLOSURE

A machine for wrapping round bodies with adhesive tape wherein the bodies to be wrapped are provided to a driving wheel having grooves formed therein. To enable the acceptance by the wheel of bodies of varying diameter the grooves may be varied in size. To this end two types of grooved discs are mounted on an axle, one type of disc being fixedly connected to said axle whereas the other type of disc is rotatably mounted on said axle. Shifting one disc relative to the other provides grooves of varying size. Adhesive tape is brought into contact with the driving wheel and with the bodies retained in the wheel grooves. A cutting device consisting of a heated wire is brought into and out of contact with said adhesive tape to provide tape strips of a desired length. The round body with a length of adhesive tape attached is then transferred to a roller arrangement which rotates the round bodies, thereby wrapping the tape around said bodies.

BACKGROUND OF THE INVENTION

This invention relates to a machine for wrapping round bodies with an adhesive tape and more particularly to a machine for enveloping electrical components, e.g., capacitors or dry cells, with an insulating adhesive tape.

It is well known in the prior art to envelope an electrical component by applying a heated shrinking sleeve. However, such a method is deficient in that heat may damage components and further that the utilization of heat shrinking material is not easily adaptable to mass production.

Prior art systems are also known for wrapping round bodies in adhesive tape but said known machines exhibit many disadvantages. For machines which cut adhesive tape by using a smooth or toothed knife there is a problem in that strands of the adhesive material settle on the cutting edge. This requires that the strands must be regularly removed and this requires an interruption of the operation of the device. Machines presently known also require that each change in the diameter of the round bodies which are to be wrapped require a change in driving wheel, since the circumferential edge of the round bodies must be level with the circumferential edge of the driving wheel.

SUMMARY OF THE INVENTION

It is therefore an object of the present invention to provide a wrapping machine which does not require the continuous application of high levels of heat to an electrical component.

It is a further object to provide such a machine with a tape cutting means which does not require cleaning.

It is a further object of the invention to provide a wrapping machine which provides a single driving wheel which can accept round bodies of varying sizes.

According to the present invention there is provided a machine for wrapping round bodies with adhesive tape including a wheel having grooves formed therein for receiving and retaining said bodies, means for bringing said tape into contact with said bodies retained in said grooves, means coupled to said wheel for severing said tape into desired lengths, and means adapted to receive said round bodies from said wheel and to rotate said bodies so that each of said lengths of tape is wrapped around each body individually.

Further objects and features of this invention will become more apparent by reference to the following description taken in conjunction with the accompanying drawings, in which:

DESCRIPTION OF THE PREFERRED EMBODIMENT

Figure 1:
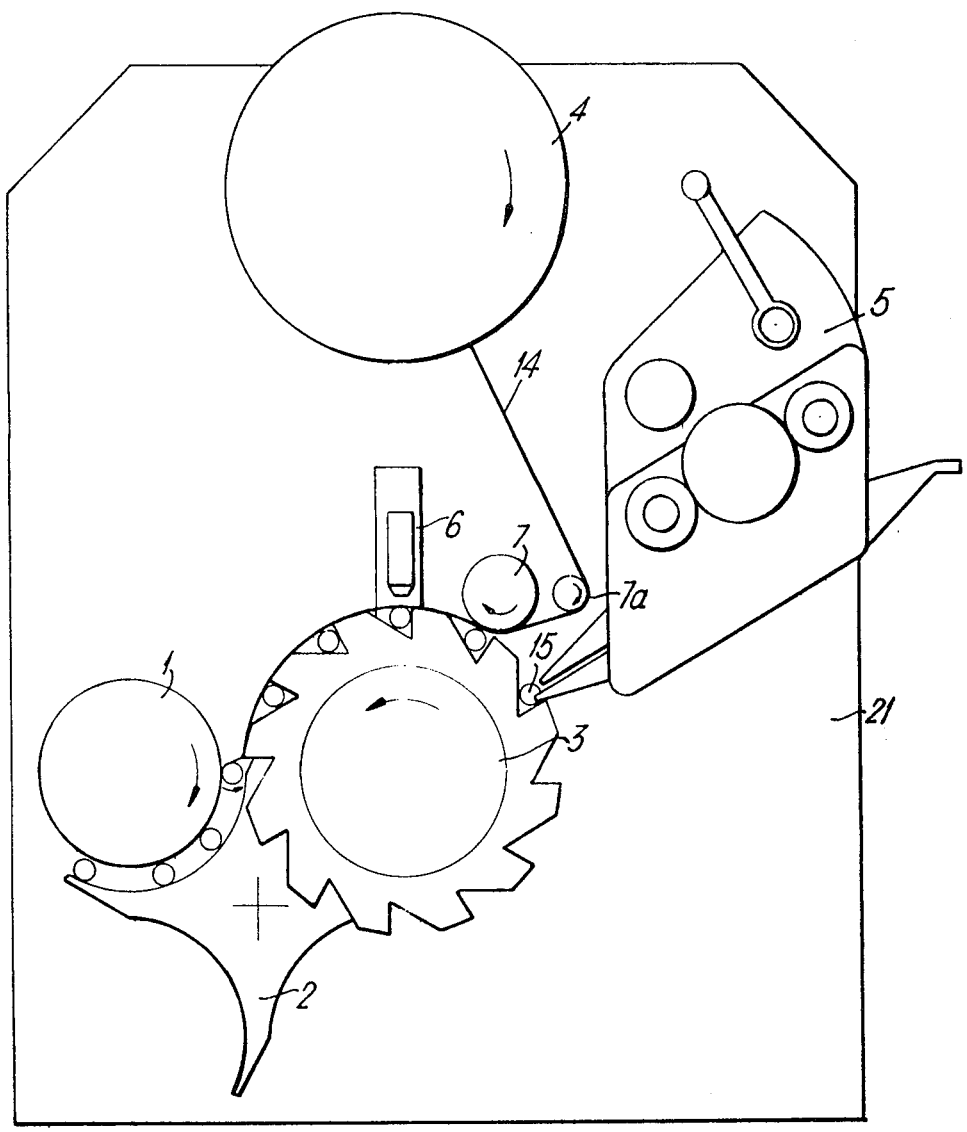
FIG. 1 is a front view of a machine showing the parts used for wrapping.

Referring to FIG. 1 there is shown a number of round bodies 15 which are to be wrapped being fed from a supply arrangement 5 which supplies said bodies individually and in a proper position into the prismatic grooves of a continuously rotating driving wheel 3. An adhesive tape 14 runs from a feed roll 4 via guide rolls 7 and 7a to the driving wheel in such a manner that the adhesive side of the tape adheres on the portions of the driving wheel between the prismatic grooves and on the round bodies in said grooves. The adhesive tape, still adhering to the driving wheel 3, is then cut by a cutting device 6 into pieces of suitable length. Finally the round bodies and the pieces of adhesive tape adhering thereto are lifted from the prismatic grooves by a lifting segment 2, seized by a driven pressure roller 1 and rotated, the round bodies rolling on the circularly shaped lifting segment 2 whereby the adhesive tape is wrapped around the round body and the latter is moved to the delivery position.

Figure 2:
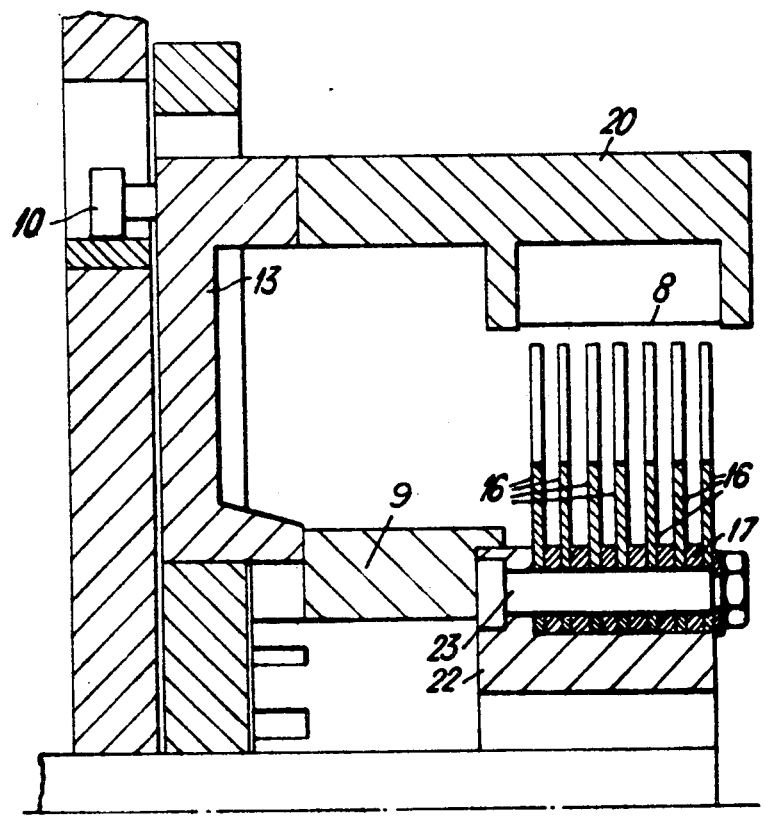
FIG. 2 shows a section view through the axis of the driving wheel.
Figure 3:
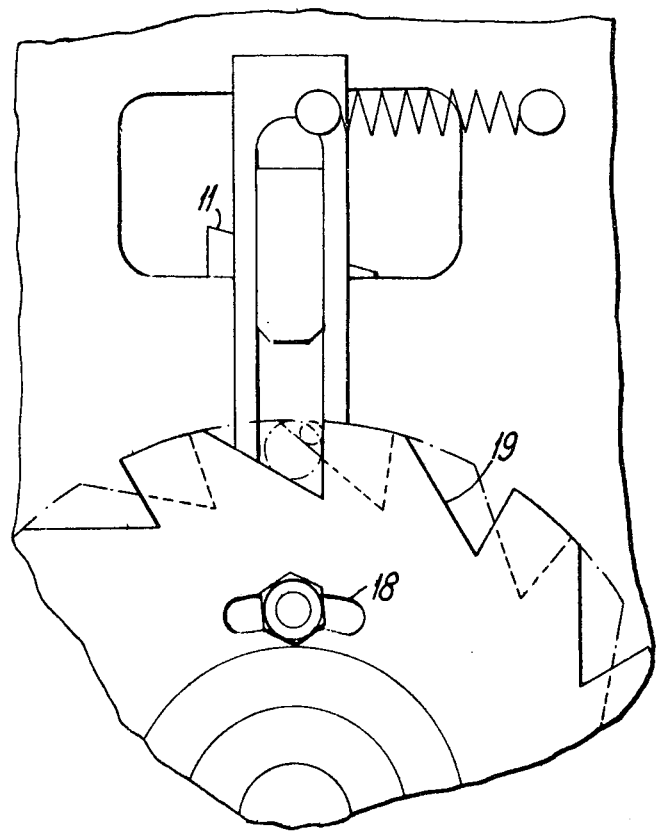
FIG. 3 shows a portion of the invention of FIG. 1 in greater detail.

Referring now to FIGS. 2 and 3, some of the machine parts involved in the wrapping process will be described in greater detail. The driving wheel 3 consists of a number of annularly shaped discs 16 of equal thickness which are fixed on an axle body 22 by means of screws 23 and spaced from each other by spacers 17. A number of said discs, preferably the odd numbered, are provided with slots 18 whereas the remaining discs are provided only with a boring for the screws 23. By unscrewing the screws 23 it is therefore possible to rotatingly shift one group of discs with respect to the other group of discs so that prismatic grooves of different depth results allowing the reception, in correct position, by the same driving wheel, of bodies of different diameters which are to be wrapped. In FIG. 3 a dashed line shows a possible shape of the prismatic grooves with shifted discs.

The different parts of the tape cutting device are also shown in FIGS. 2 and 3. The cutting tool consists of a heating wire 8 with adjustable temperature which is held in a support 20. The support 20 is fixedly connected to a seizing lever 13 which can engage the grooves of a toothed wheel 9 fixedly connected to the driving wheel 3. When the seizing lever 13 falls into a groove of the toothed wheel 9 the heating wire moves against the axis of the driving wheel and cuts the adhesive tape by melting. Since the toothed wheel 9 is fixedly connected to the driving wheel 3 the cutting device rotates together with the driving wheel until a lifting roller 10 is moved so far onto a wedge 11 mounted on a fixed mounting plate 21

(FIG. 1) that the seizing lever is disengaged from the toothed wheel 9 and is carried back to the initial position under the action of a spring 12. This process is repeated for each groove of the toothed wheel, the toothed wheel 9 being provided with the same number of grooves as the driving wheel 3 comprises prismatic grooves for receiving round bodies.

We claim:

1. A machine for wrapping round bodies with an adhesive tape comprising:

a base;

a wheel, coupled to said base, having grooves formed therein for receiving and retaining said bodies, said wheel comprising a first grooved disc arranged to rotate axially and a second grooved disc axially fixed, the relative rotation of said first and second discs allowing the varying of the size of the wheel grooves so as to provide for the accommodation of bodies of different diameters;

means for bringing said tape into contact with said bodies retained in said grooves;

means coupled to said wheel for severing said tape into desired lengths; and means adapted to receive said round bodies from said wheel and to rotate said bodies so that each length of tape is wrapped around each body individually.

2. A machine for wrapping round bodies, according to claim 1, wherein said severing means comprises:

a heating element;

a toothed wheel fixedly connected to said grooved wheel; and a lever connected to said heating element and engaging said toothed wheel, thereby providing that said heating element is brought into and out of contact with said tape.

3. A machine for wrapping round bodies, according to claim 2, wherein said toothed wheel has a number of teeth equal to the number of grooves of said grooved wheel.

4. A machine for wrapping round bodies, according to claim 1, wherein said receiving means comprises:

a pressure roller for rotating said bodies to wrap said tape around said bodies; and lifting means for transferring said bodies from said grooved wheel to said pressure roller.

References Cited

UNITED STATES PATENTS

| | | | |
|---|---|---|---|
| 2,980,565 | 4/1961 | Bardach et al. | 156—567 X |
| 3,156,246 | 11/1964 | Burkhard | 156—450 X |
| 2,483,458 | 10/1949 | Fischer et al. | 156—521 |
| 3,415,704 | 12/1968 | Bate | 156—515 |

BENJAMIN A. BORCHELT, Primary Examiner

J. M. HANLEY, Assistant Examiner

U.S. Cl. X.R.

156—187, 450, 456, 522